United States Patent [19]

Hamasaki

[11] 4,366,950

[45] Jan. 4, 1983

[54] METHOD AND APPARATUS FOR CUTTING STAINLESS STEEL

[75] Inventor: Masanobu Hamasaki, Takamatsu, Japan

[73] Assignees: Agency of Industrial Science & Technology; Ministry of International Trade & Industry, both of Tokyo, Japan

[21] Appl. No.: 231,357

[22] Filed: Feb. 4, 1981

[30] Foreign Application Priority Data

Feb. 26, 1980 [JP] Japan .................................. 55-23575

[51] Int. Cl.³ .............................................. B23K 7/08
[52] U.S. Cl. ........................................ 266/49; 266/66; 266/67; 266/72; 266/74; 266/77
[58] Field of Search ....................... 266/48, 49, 66, 67, 266/69, 71, 72, 74, 77; 219/121 EH, 121 PC

[56] References Cited

U.S. PATENT DOCUMENTS

| | | | |
|---|---|---|---|
| 857,247 | 6/1907 | Menne | 266/48 |
| 1,977,640 | 10/1934 | Linden | 266/66 |
| 2,036,734 | 4/1936 | Kehl | 266/66 |
| 2,116,870 | 5/1938 | Rockefeller et al. | 266/71 |
| 3,174,736 | 3/1965 | Cameron | 266/66 |
| 3,967,090 | 6/1976 | Hamasaki et al. | 219/70 |

*Primary Examiner*—John P. Sheehan
*Attorney, Agent, or Firm*—Oblon, Fisher, Spivak, McClelland & Maier

[57] ABSTRACT

Gas cutting of a plate material such as of stainless steel or stainless-clad steel is efficiently carried out by advancing a cutting torch along a mild steel bead formed on the material by melting thereon mild steel using a welding torch. When the material preheated in advance is burnt by directing a jet of oxygen thereto, the mild steel bead on the material effects to elevate the combustion temperature, thereby allowing refractory slag produced in cutting to be fused and blown off by virtue of the jet of oxygen.

7 Claims, 6 Drawing Figures

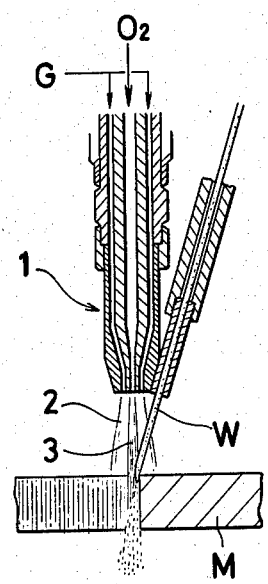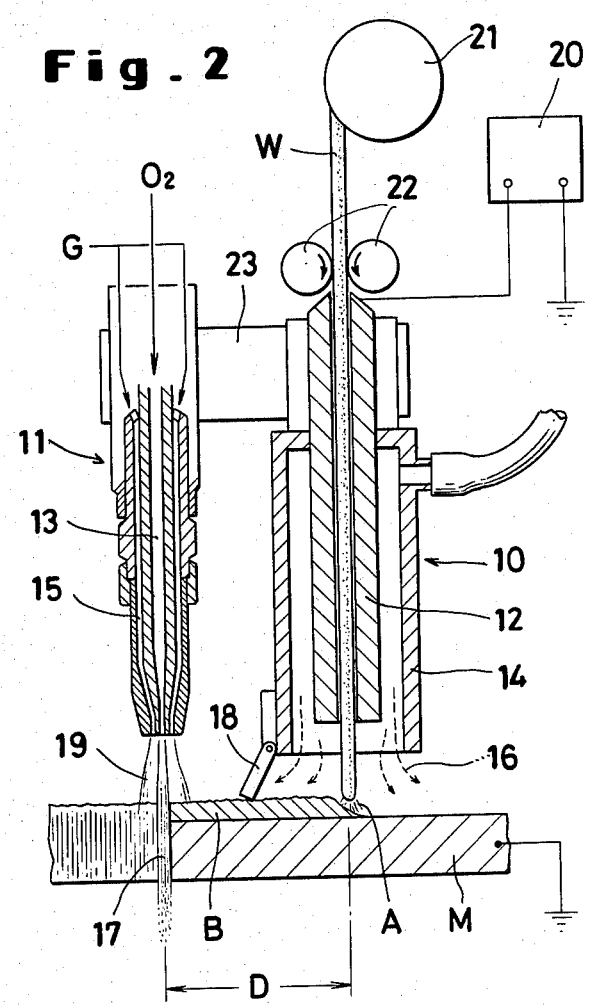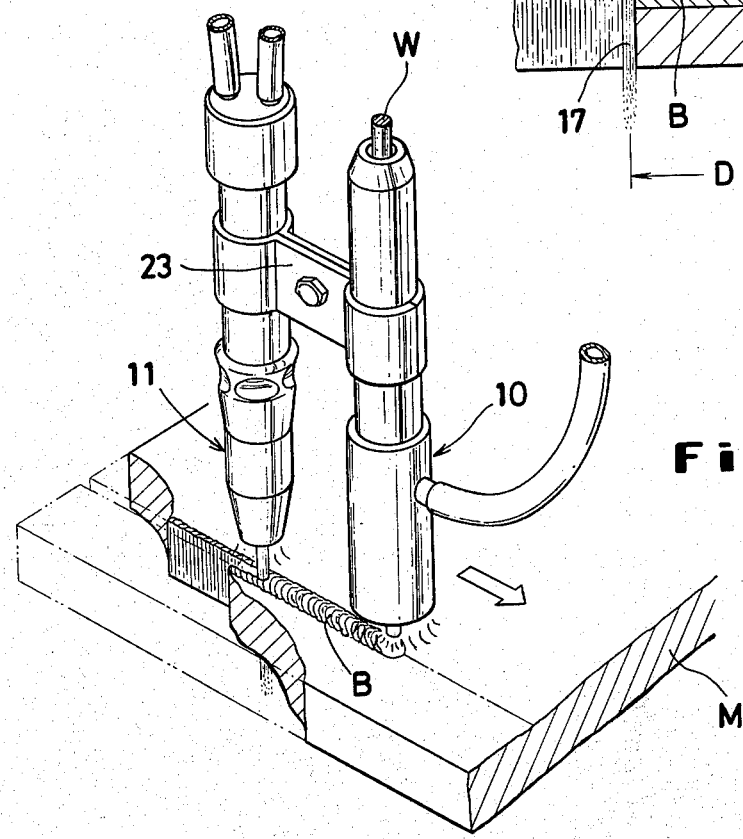

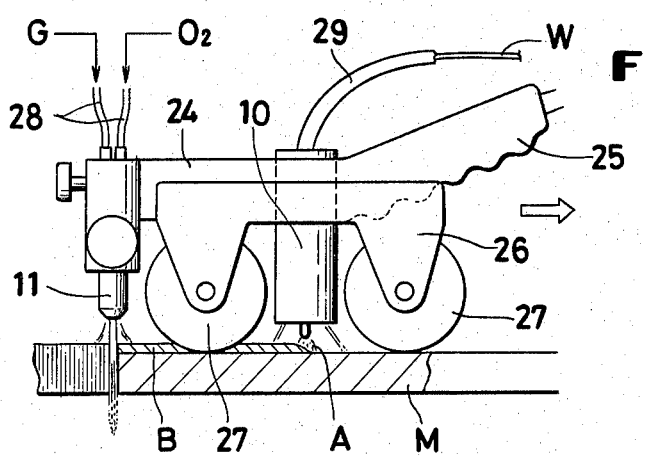
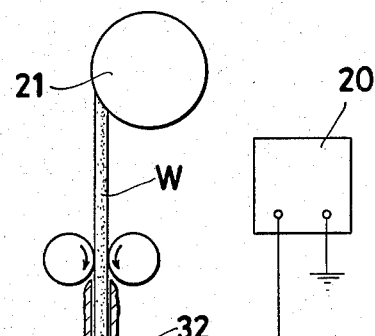
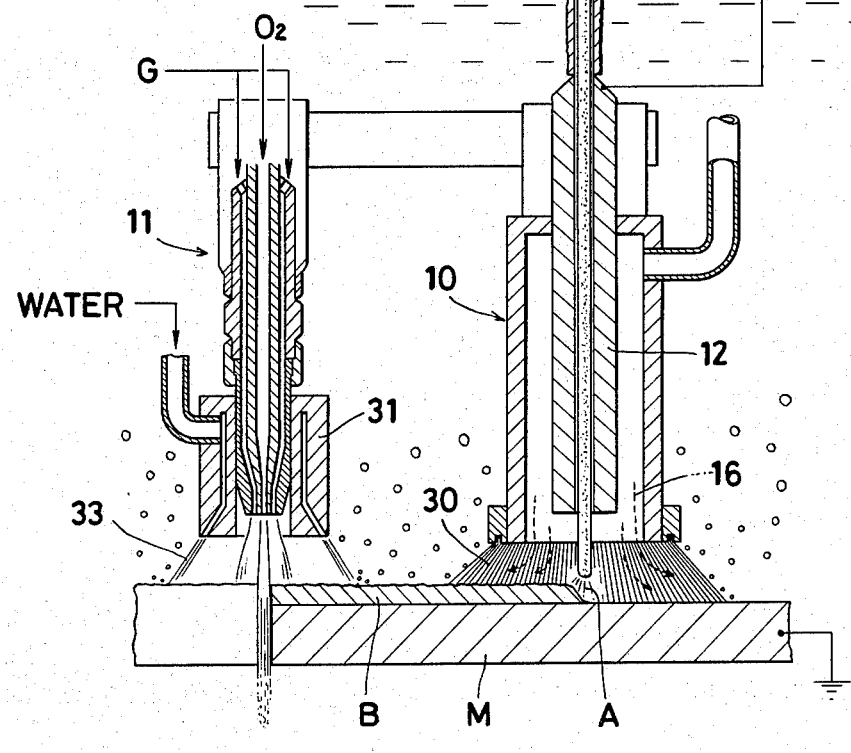

METHOD AND APPARATUS FOR CUTTING STAINLESS STEEL

BACKGROUND OF THE INVENTION

This invention relates to a gas cutting method and a gas cutting apparatus adapted to effectively cut stainless steel or stainless clad steel, for example.

For cutting of stainless steel and stainless-clad steel (hereinafter, referred to simply as "stainless steel"), there has been no way available except for the flux-oxygen cutting method and the power cutting method. This is because, in oxygen cutting, it is necessary to expose the cut surface of the material to the air in order to allow the reaction (combustion) of the cut surface of the material with oxygen gas. However, when the stainless steel is fused, slag (oxides) which has a melting temperature higher than that of stainless steel and is hard to fuse is produced. This slag covers the cut surface of the stainless steel thereby hindering combustion of the stainless steel and making the cutting impossible.

In powder cutting and flux cutting, iron powder or antioxidizing flux is supplied into the oxygen stream from a cutting torch and is burnt along with the stainless steel to heighten the temperature of combustion and to enhance the flowability of the slag with the result that the slag is scattered by virtue of the jet of oxygen from the torch. However, in these conventional cutting methods, well-dried superfine particles of iron or flux have to be sprayed constantly and uniformly into the oxygen stream at a high speed. This requirement has necessitated sophisticated techniques and made powder cutting devices extremely complicated in structure, giving rise to mechanical malfunctions and inadequate operation. Also, the conventional powder cutting and flux cutting devices have not been effective in underwater operations because powder or flux becomes wet and sticks inside hole of the torch and consequently, the oxygen stream from the torch is disrupted.

In order to eliminate the foregoing disadvantage, the inventor previously proposed a cutting torch according to the called wire cutting method. In this device, as illustrated in FIG. 1, preheating gas G (acetylene, propane, hydrogen, etc.) is injected from the tip of a cutting torch 1 toward a material M to be cut to form a preheating flame 2 and oxygen $O_2$ is injected to form an oxygen stream 3, as in the common gas cutting device. The material preheated by the flame 2 is burnt by the oxygen, but refractory slag produced when stainless steel is cut cannot be removed for reason mentioned earlier. Then, a fine steel wire W playing the role of the iron powder in powder cutting is supplied into the oxygen stream 3 and is burnt to heighten the combustion temperature with the result that the slag is fused and scattered. This method is very effective in cutting a relatively thin plate of stainless steel. However, it is difficult to cut a stainless steel plate with a thickness of 50 mm or more because the wire supplied into the oxygen stream interferes therewith.

In passing, it is noted that the inventor has developed another cutting torch capable of cutting thick metallic plate (U.S. Pat. No. 3,967,090). The art described in U.S. Pat. No. 4,273,982 is similar to the above U.S. Patent. The devices taught by these arts are respectively provided with a water jet nozzle to the rear of the gas cutting torch. This water jet nozzle is adapted to inject pressure water for blowing off the dross (slag) produced when cutting a metallic material by use of the cutting torch. However, these devices are improper for cutting stainless steel insomuch as the slag produced from the stainless steel cannot be blown off and besides, the water injected from the nozzle in the proximity of the cutting torch reduces cutting efficiency.

Otherwise, an arc cutting methods such as metal arc cutting and oxygen arc cutting are applied for cutting metals including stainless steel. However, the electrode used in an arc cutting device is so quickly consumed that it is not suitable for continuous cutting over long periods as in the case of cutting a thick and large stainless steel plate.

Because of the situation described above, a new cutting technique adapted to efficiently cut thick stainless steel plates continuously over long periods even under water and being applicable to an automatic system has been desired.

SUMMARY OF THE INVENTION

An object of the present invention is to provide a gas cutting method and apparatus for efficiently cutting stainless steel even under water, continuously over long periods.

Another object of the present invention is to provide a gas cutting method and apparatus applicable to an automatic cutting system.

To accomplish the objects described above according to this invention, there is provided a gas cutting method which comprises the steps of forming mild steel bead on the surface of a metallic plate such as stainless steel and injecting a jet-flame along the mild steel bead to burn the metallic plate along with the mild steel bead. The apparatus which embodies this method comprises a welding torch for forming the mild steel bead on the metallic plate and a gas cutting torch adapted to carry out oxygen cutting integrally mounted on the welding torch at such a distance therefrom that the welding torch does not interfere with the cutting torch.

According to this method, the mild steel bead used as a solvent for the slag produced in cutting the stainless steel can be uniformly formed and does not cause any trouble in the torch of the kind experienced in powder cutting or any disturbance of the oxygen stream injected from the cutting torch. Further, the bead can easily be controlled in its amount, so that even an extremely thick stainless steel plate can be processed. On the whole, the welding torch in this method expends only a small amount of the welding electrode for forming the bead and therefore, cutting operation can be carried out over long periods.

The other objects and characteristics of the present invention will become apparent from the following detailed description of the invention with reference to the accompanying drawings.

BRIEF DESCRIPTION OF THE DRAWINGS

FIG. 1 is a schematic side view of a conventional wire cutting device.

FIG. 2 is a schematic side view of the first embodiment of the gas cutting apparatus according to the present invention.

FIG. 3 is a perspective view of the gas cutting apparatus illustrated in FIG. 2.

FIG. 4 is a schematic side view of the second embodiment of the present invention.

FIG. 5 is a schematic side view of the third embodiment of the present invention.

DESCRIPTION OF THE PREFERRED EMBODIMENTS

Figure 6:
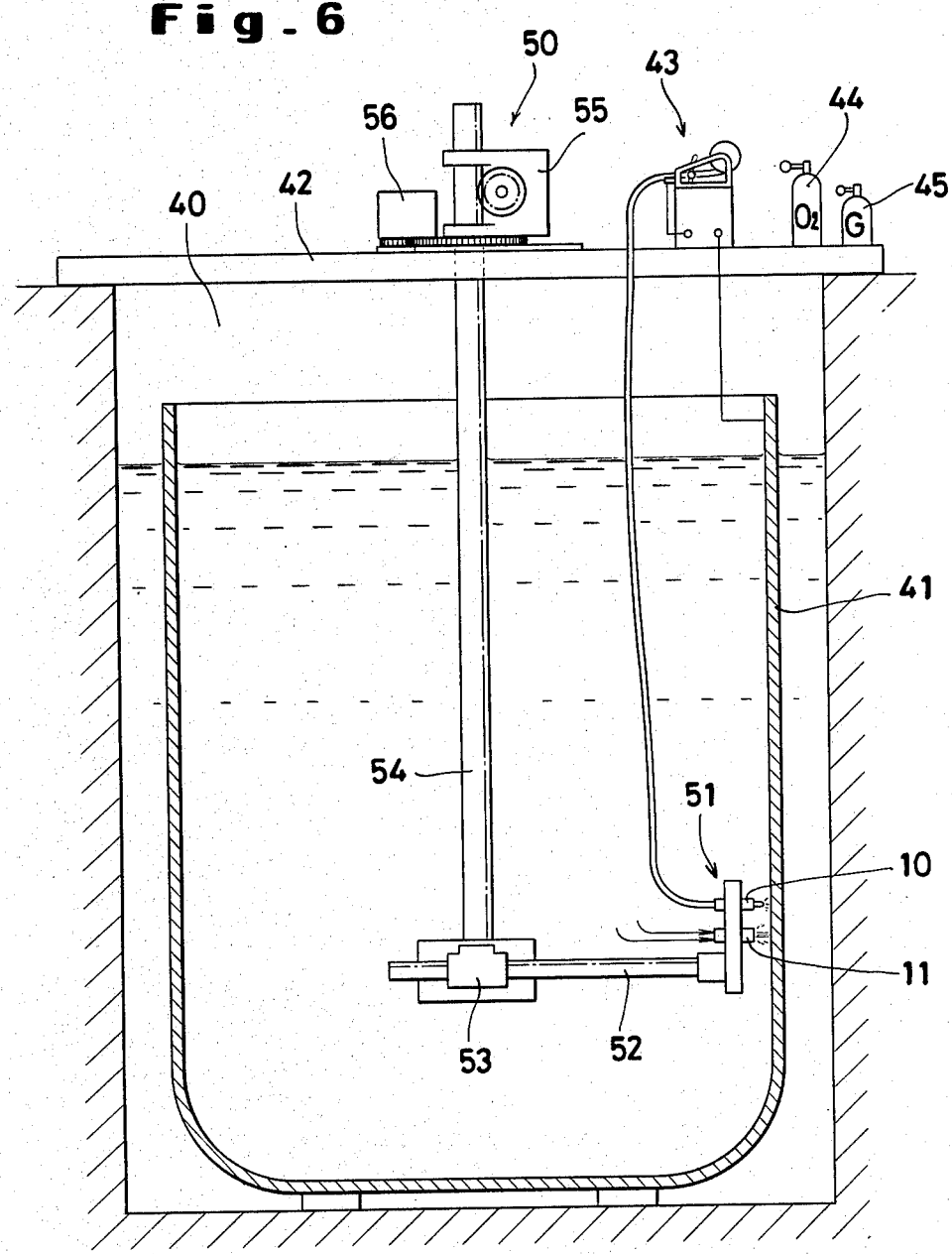
FIG. 6 illustrates schematically the application of the gas cutting apparatus in FIG. 5 to an underwater cutting operation.

Referring first to the embodiments of the invention illustrated in FIGS. 2 and 3, the improved gas cutting apparatus comprises an arc welding torch 10 and a cutting torch 11 each of the known type. The arc welding torch 10 is provided with a wire-supplying tube 12 for carrying a welding wire W of mild steel toward a base material M. An electric arc A is produced between the wire W and the material M by applying an electric current therebetween from a power source 20, thereby fusing the wire W. When the welding torch 10 moves over the material M with an electric current applied between the wire W and the material M, the molten metal produced from the wire in consequence of the application of an electric current is stuck to the surface of the material M to form a bead B. The wire W is automatically fed from a wire reel 21 by means of a pair of rollers 22 as in an automatic welding machine. To heighten the fusibility of the wire W due to the arc, a shielding gas tube 14 is coaxially provided on the wire-supplying tube 12 at a distance from the external surface of the wire-supplying tube so as to discharge from the shielding gas tube 14 a shielding gas 16 such as carbon-dioxide, argon or a mixed gas thereof, thereby protecting a molten pool formed on the material in front of the leading end of the wire W from the ambience.

Though, as one preferred embodiment, the oxygen-cutting torch 11 herein described has the same structure as the torch illustrated in FIG. 1, wherein passages for oxygen and preheating gas are coaxially arranged, these passages may be eccentrically arranged and further, two nozzles possessing such passages may be separately provided in parallel with each other as in the conventional cutting apparatus. A preheating gas G is discharged from an exhaust port at the leading end of the torch through a passage 15 to form a preheating flame 19 and at the same time, high-pressure oxygen $O_2$ is discharged from another exhaust port at the leading end of the torch through a passage 13 so as to pass the jet stream 17 of oxygen through the flame 19. While the material M is heated by the flame 19, the jet stream 17 is supplied to the heated portion of the material M for causing a reaction of the material M with oxygen (combustion of the material) and thereby fusing the material. However, when the material of stainless steel is cut according to such a method, oxides (slag) which are hard to fuse are produced to hinder cutting of the material.

Thus, in this embodiment, the mild steel bead formed on the surface of the material M by means of the welding torch 10 acts as a medium for heightening combustion temperature, thereby to melt even the hard-to-fuse slag. The molten slag is blown off by the high pressure stream of oxygen and consequently, efficiency of cutting is increased.

Although cutting with the cutting torch can be done after the bead formed on the material by the welding torch has completely cooled, it is, however, more desirable to cut the material before heat dissipates substantially since the greater the amount of remaining heat, the less preheating required and the greater the saving in preheating gas. Theoretically, if the material retains a temperature over 1,200° C. after the bead is formed, there is no need for the preheating process by use of a combustible gas from the cutting torch 11. It is, therefore, desirable to unite the welding torch with the cutting torch in as close proximity as possible by means of a holding connector 23 as illustrated in the drawings. From this alone, it would be concluded that the shorter the distance D between the torches is, the better. However, when the torches are positioned too close to each other, the shielding gas 16 discharged from the welding torch 10 is disturbed by the jet stream of oxygen discharged from the cutting torch 11, thereby not only to affect the arc formation but to dirty the cutting torch with sputtered material produced in arc welding. To eliminate such a disadvantage, it is desirable to provide a separator 18 on the welding torch 10.

The rates at which the cutting torch 11 and the welding torch 10 move over the material M depends on the thickness of the material. Where the torches 10, 11 are made integral as already described, the running speed of the united torches must be determined by the time required for the cutting torch which takes longer to complete its work. Also the diameter and feed speed of the welding wire and the arc current value required for arc generation must be determined according to the thickness of the material to be processed. In case an extremely thick material is cut at a very slow speed, in order to prevent the height of the bead formed by the welding torch from becoming too high, the weaving method wherein the welding torch moves in a zigzag pattern may be employed to form a broad bead train. An automatic cutting system can also be attained by applying the known weaving mechanism to the aforesaid cutting apparatus.

It might be presumed that so-called 'stack cutting' would give rise to the same results as this invention. By stack cutting, which is carried out by placing an iron wire or plate on the base material to be cut instead of producing the welding bead in this invention, it is, however, impossible to cut the base material under such an iron wire or plate due to gaps inevitably occurring between the iron wire or plate and the base material to be cut. These gaps occur because of scales, existing between the wire or plate and the material to be cut or because of irregularities in the surface of the material to be cut. Such a problem can be solved with considerable difficulty by fastening the iron plate tightly to the base material with powerful force using some suitable tool or by fixing the iron on the base material in advance by welding, for example. However, compared with the conventional techniques, the method according to this invention is far more advantageous from the standpoint of labor saving and reliability.

The connector 23 which holds the torches 10 and 11 at a fixed distance may be provided with a means by which the distance between the torches can be adjusted and the respective torches can be rotated in all directions in relation to the connector in compliance with various working conditions or other factors.

When the apparatus of this invention is practically embodied, the welding torch 10 and the cutting torch 11 integrally supported by the connector 24 may be fixedly mounted on a carriage 26 having two pairs of wheels 27 as illustrated in FIG. 4, thereby to maintain a suitable distance between the tip of each torch and the surface of the material M. One end of the connector 24 may be extended to form a grip 25 useful for manual cutting operations. Also, an automatic cutting apparatus can easily be accomplished by installing a motor on the carriage 26. In this apparatus, a welding wire W is fed to the welding torch 10 through a wire-supplying pipe 29, and oxygen $O_2$ and a preheating gas G are supplied to the cutting torch 11 through gas-supplying tubes 28. By means of the known conventional technique, it is easy to full-automatically control the supply of the welding wire and the gases and the motion of the carriage 26.

The embodiment illustrated in FIG. 5 is adapted for cutting stainless steel under water. The welding and cutting torches are respectively provided with a means for isolating the portion to be processed on the material M from water. On the welding torch 10 a wire brush curtain 30 is provided at the leading end of the torch so as to utilize the pressure of the shielding gas 16 supplied into the space defined by the curtain 30, to prevent the interior space surrounded by the curtain 30 from infiltration of water thereinto, thereby protecting the bead B being formed on the surface of the material to be processed. On the cutting torch 11 is provided a circular nozzle 31 from which a water jet is discharged to form a water curtain 33 around the tip of the torch in such a manner that the preheating flame formed beyond the tip of the torch is surrounded, thereby to ensure stable combustion like that obtained in the atmosphere. The fundamental structure of the welding and cutting torches is similar to the aforementioned embodiment except for a wire-guide sleeve 32 to keep the welding torch waterproof.

This underwater cutting apparatus is especially useful in the work of dismantling the pressure vessel of an atomic pile. Such piles are usually made from extremely thick stainless steel or stainless-clad steel plate and are radioactive. The cutting up of a radioactive atomic pile leads to radioactive contamination of the air if carried out using heat in the atmosphere. Thus, to eliminate the problem, an underwater plasma cutting method has been recommended. However, even by the plasma cutting method, high-pressure gas such as argon which is discharged after serving its purpose in the creation of plasma becomes radioactive during the cutting operation and is released into the air, thereby giving rise to radioactive contamination of the air.

According to this invention, no radioactive contamination is released into the air even in cutting of a radioactive steel plate using heat. This is because the oxygen in excess of that required for combustion of the material to be cut reacts with the hydrogen component of the gas for preheating to produce water.

Referring to FIG. 6, the dismantling of the radioactive pressure vessel 41 of an atomic pile using the cutting apparatus of this invention will be described hereinafter. The vessel 41 is sunk to the bottom of a pit 40 filled with water. On a beam 42 passing over the pit 40 are suitably stationed a gas-cutter 50, a welder 43, an oxygen gas cylinder 44 and a preheating-gas cylinder 45 as illustrated. The gas-cutter 50 is composed of a horizontal arm 52 provided at its leading end with a cutting head 51, a vertical arm 54 having a drive means 53 for horizontally transferring the cutting head 51, a vertical-drive means 55 adapted to vertically move the vertical arm 54 and placed on the beam 42 and a rotational-drive means 56 for rotating the vertical arm 54. The welding wire is fed from the welder 43 to the welding torch 10 mounted on the cutting head 51, and gases are supplied from the gas cylinders 44, 45 to the cutting torch 11. By controlling the drive means 53, 55, 56, the cutting head 51 can be transferred to any desired location over the whole wall of the vessel 41.

As is clear from the disclosure thus far made, according to the gas cutting method proposed by this invention, metallic material which cannot be easily gas-cut, such as stainless steel, can easily and effectively be cut even if extremely thick, and further, cutting performance equivalent to that in the air can be attained under water. The apparatus of this invention which basically consists of a unit having welding and cutting torches may be modified on the basis of the conventional arts as occasion demands, and it is to be understood that all matters hereinabove set forth or shown in the accompanying drawings are to be interpreted as illustrative and not in any limiting sense.

What is claimed is:

1. An apparatus for cutting a material such as stainless steel, which comprises a welding torch for melting a mild steel to form a mild steel bead on the material to be cut; a cutting torch having two nozzles from which a mixed gas for preheating the material and a jet of oxygen for burning said bead and material to be cut are respectively discharged toward and along said bead; and a connector for connecting said welding torch with said cutting torch at a fixed distance, wherein said welding torch is provided around its lower end with a wire brush curtain and said cutting torch is provided at its lower end with a circular nozzle for discharging a jet of water to form a water curtain.

2. An apparatus for gas cutting of a stainless steel substrate, which comprises a welding torch for melting a mild steel to form a mild steel bead on said substrate to be cut, said welding torch including means for discharging a shielding gas, a cutting torch having two nozzles from which a mixed gas for preheating said substrate and a jet of oxygen for burning said bead and said substrate to be cut are respectively discharged toward and along said bead, a holding connector for connecting said welding torch and said cutting torch at a fixed distance, and a separator provided in fixed relationship with said welding torch and said cutting torch for preventing said shielding gas discharged from said welding torch from being disturbed by said jet of oxygen discharged from said cutting torch.

3. The apparatus according to claim 2, wherein said welding torch is a carbon dioxide arc welding torch.

4. The apparatus according to claim 2 or 3, further comprising a wire brush for forming an air curtain on the leading end of said welding torch and a water jetting nozzle for forming a water curtain on the leading end of said cutting torch.

5. An apparatus according to claim 1 or 2, wherein said welding torch comprises a wire-supplying tube for constantly carrying a welding wire toward said material to be cut and a shielding-gas tube provided coaxially on said wire-supplying tube at a fixed distance and adapted to discharge a shielding gas, whereby an electric current is applied between said welding wire and the material to create an electric arc and consequently, fusing the welding wire to form a bead on the material to be cut.

6. An apparatus according to claim 1 or 2, wherein said welding torch and cutting torch respectively supported by said connector are fixedly mounted on a carriage having two pairs of wheels, thereby allowing said torches to be moved over the material to be cut with a suitable distance maintained between the torches and the material.

7. An apparatus according to claim 1 or 2, wherein one end of said connector is extended to form a grip.

* * * * *